US005817373A

United States Patent [19]

Cathey et al.

[11] Patent Number: 5,817,373

[45] Date of Patent: Oct. 6, 1998

[54] DRY DISPENSE OF PARTICLES FOR MICROSTRUCTURE FABRICATION

[75] Inventors: David A. Cathey; Kevin Tjaden; James J. Alwan, all of Boise, Id.

[73] Assignee: Micron Display Technology, Inc., Boise, Id.

[21] Appl. No.: 764,756

[22] Filed: Dec. 12, 1996

[51] Int. Cl.$^{6}$ .............................. B05D 1/06; B05D 1/32; C03C 25/06

[52] U.S. Cl. ........................ 4427/458; 427/468; 427/469; 427/282; 156/643.1; 216/42; 216/51; 216/72

[58] Field of Search .................................... 427/180, 458, 427/466, 468, 469, 485, 486, 282; 156/643.1; 216/49, 42, 51, 72

[56] References Cited

U.S. PATENT DOCUMENTS

| | | | |
|---|---|---|---|
| 3,556,255 | 1/1971 | Lomax, Jr. | 427/475 |
| 4,407,695 | 10/1983 | Deckman et al. | 156/643 |
| 5,312,514 | 5/1994 | Kumar | 156/643 |
| 5,399,238 | 3/1995 | Kumar | 156/643 |
| 5,411,630 | 5/1995 | Nagase et al. | 216/22 |

FOREIGN PATENT DOCUMENTS 152676 7/1987 Japan .

OTHER PUBLICATIONS

Advanced Display Systems, Inc., Richardson, Texas, "ASDM–05 Automatic Spacer Distributor Machine" No Date.

Thesis by Mark Allen Gilmore, Northeastern University, Boston, Massachusetts, Jul. 30, 1992, "The Application of Field Emitter Arrays to Gaseous Ion Production", pp. 1–107.

*Primary Examiner*—Shrive Beck
*Assistant Examiner*—Fred J. Parker
*Attorney, Agent, or Firm*—Hale and Dorr LLP

[57] ABSTRACT

A substrate is placed on a charging surface, to which a first voltage is applied. Etch-resistant dry particles are placed in a cup in a nozzle to which a second voltage, less than the first voltage, is applied. A carrier gas is directed through the nozzle, which projects the dry particles out of the nozzle toward the substrate. The particles pick up a charge from the potential applied to the nozzle and are electrostatically attracted to the substrate. The particles adhere to the substrate, where they form an etch mask. The substrate is etched and the particles are removed. Emitter tips for a field emission display may be formed in the substrate.

26 Claims, 6 Drawing Sheets

DRY DISPENSE OF PARTICLES FOR MICROSTRUCTURE FABRICATION

GOVERNMENT RIGHTS

This invention was made with Government support under Contract No. DABT63-93-C-0025 awarded by the Advanced Research Projects Agency (ARPA). The Government has certain rights in this invention.

BACKGROUND OF THE INVENTION

The present invention relates to the fabrication of microstructures on a substrate and, in particular, to processes for fabricating masks for the fabrication of microstructures, such as emitter tips for field emission displays, on a substrate.

The fabrication of micron and sub-micron structures or patterns into the surface of a substrate typically involves a lithographic process to transfer patterns from a mask onto the surface of the material. Such fabrication is of particular importance in the electronics industry, where the material is often a semiconductor.

Generally, the surface of the substrate is coated with a resist, which is a radiation sensitive material. A projecting radiation, such as light or X-rays, is then passed through a mask onto the resist. The portions of the resist that are exposed to the radiation are chemically altered, changing their susceptibility to dissolution by a solvent. The resist is then developed by treating the resist with the solvent, which dissolves and removes the portions that are susceptible to dissolution by the solvent. This leaves a pattern of exposed substrate corresponding to the mask.

Next, the substrate is exposed to a liquid or gaseous etchant, which etches those portions that are not masked by the remaining resist. This leaves a pattern in the substrate that corresponds to the mask. Finally, the remaining resist is stripped off the substrate, leaving the substrate surface with the etched pattern corresponding to the mask.

Another method useful for fabricating certain types of devices involves the use of a wet dispense of colloidal particles. An example of this technique is described in U.S. Pat. No. 4,407,695, the disclosure of which is incorporated herein by reference. With the wet dispense method, a layer of colloidal particles contained in solution is disposed over the surface of a substrate. Typically, this is done though a spin coating process, in which the substrate is spun at a high rate of speed while the colloidal solution is applied to the surface. The spinning of the substrate distributes the solution across the surface of the substrate.

The particles themselves serve as an etchant, or deposition, mask. If the substrate is subject to ion milling, each particle will mask off an area of the substrate directly underneath it. Therefore, the etched pattern formed in the substrate surface is typically an array of posts or columns corresponding to the pattern of particles.

Although the wet dispense method has some advantages over the lithographic process, it has its own deficiencies. For example, the spinning speed must be precisely controlled. If the spin speed is too low, then a multi-layer coating will result, instead of the desired monolayer of colloidal particles. On the other hand, if the spin speed is too high, then gaps will occur in the coating. Further, owing to the very nature of the process, a radial non-uniformity is difficult to overcome with this method.

Another problem with colloidal coating methods is that they require precise control of the chemistry of the colloidal solution so that the colloidal particles will adhere to the substrate surface. For example, if the colloidal particles are suspended in water, the pH of the water must be controlled to generate the required surface chemistry between the colloidal particles and the substrate. However, it is not always desirable to alter the pH or other chemical properties of the colloidal solution. Also, if the colloidal solution fails to wet the surface of the substrate, the particle coating may not be uniform.

In addition, wet dispense methods tend to be expensive and prone to contaminating the substrate.

SUMMARY OF THE INVENTION

In accordance with the present invention, dry particles coat a substrate, forming a pattern for etching the substrate. In a preferred embodiment, both the substrate and the particles are electrically charged, so as to create an electrostatic attraction. The dry particles are projected through a nozzle onto the substrate with a carrier gas that is not reactive with the particles or the substrate, such as nitrogen or a chlorofluorocarbon. Preferably, the dry particles are beads made from latex or glass.

The dry particles are etch resistant and serve as an etching mask. The substrate is etched, leaving columns under the particles. The columns can be further refined, for example, by shaping them into emitter tips for a field emission display.

BRIEF DESCRIPTION OF THE DRAWINGS

For a more complete understanding of the invention, reference is made to the following detailed description taken in conjunction with the accompanying drawings, in which.

DETAILED DESCRIPTION OF PREFERRED EMBODIMENTS

Figure 1:
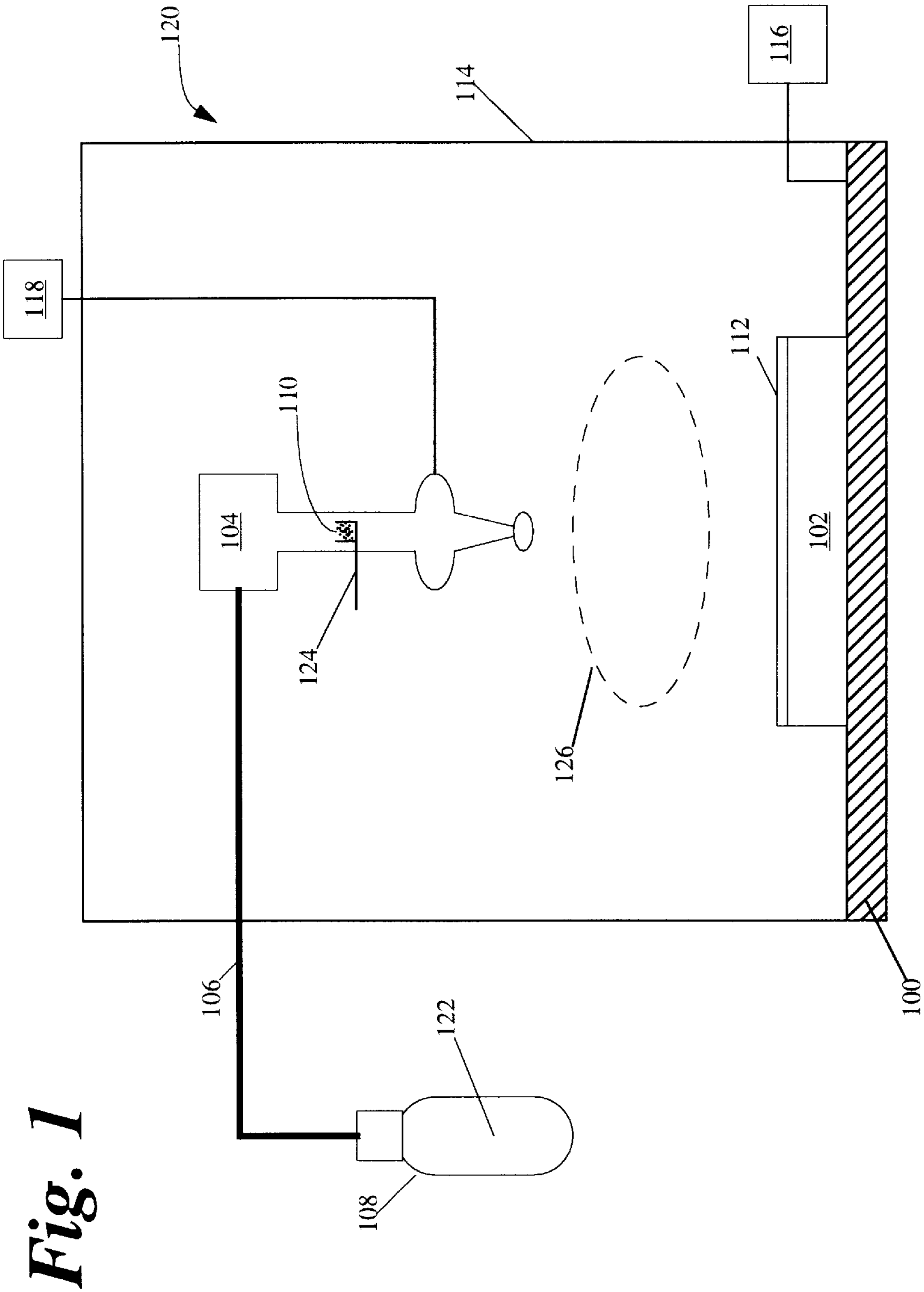
FIG. 1 is a schematic diagram of an apparatus for use with the present invention.

As shown in FIG. 1, dispensing apparatus 120 includes a charging surface 100, which is connected to a voltage source 116. A substrate 102 is placed on top of charging surface 100. When surface 100 is charged by surface voltage source 116, substrate 102 may also be charged. Preferably, substrate 102 is a silicon substrate. However, other substrates may also be used.

Nozzle 104 is mounted above substrate 102, with the exit end 126 of nozzle 104 directed toward the upper surface 112 of substrate 102. Nozzle 104 is connected to nozzle voltage source 118. Surface voltage source 116 and nozzle voltage source 118 bring substrate 102 and nozzle 104 to different voltages to create adequate electrostatic attraction between particles projected through nozzle 104 and substrate 102. Preferably, surface voltage source 116 brings substrate 102 to a potential approximately 5000 to 80,000 volts above (or below) the potential to which nozzle voltage source 118 brings nozzle 104.

Nozzle 104, substrate 102, and charging surface 100 are enclosed by walls 114 of dispensing apparatus 120, to prevent contamination of substrate 102. Laminar or stagnant air or another gas fills dispensing apparatus 120.

Pressurized gas container 108 is connected to nozzle 104 by line 106. Container 108 contains carrier gas 122. Dry particles 110 are held in cup-shaped holder 124 within nozzle 104. Alternatively, dry particles 110 could be injected into nozzle 104 through line 106 or through a separate line.

In a preferred embodiment, dry particles 110 are etch-resistant beads made of glass or latex. For example, the particles could be polystyrene latex microspheres manufactured by IDC, Inc. The microspheres may be hydrophilic or hydrophobic. In a preferred embodiment, hydrophilic microspheres are formed by a carboxylate modified latex with a diameter of approximately 1.0 microns or hydrophobic microspheres are formed from zwitterionic amidine carboxyl latex with a diameter of approximately 0.87 microns. Alternatively, the dry particles may be silicon dioxide beads, such as those manufactured by Bangs Laboratories having a diameter of approximately 1.0 microns.

Preferably, carrier gas 122 is not reactive with dry particles 110 or with substrate 102. For example, carrier gas 122 could be nitrogen or a chlorofluorocarbon, such as freon.

In operation, carrier gas 122 flows into nozzle 104, and then flows out the exit end 126, carrying with it dry particles 110. Preferably, dry particles 110 are between approximately 0.5 and 1.5 microns in diameter and the openings in nozzle 104 are on the order of 200 microns in diameter. More generally, dry particles 110 are typically between approximately 0.1 and 2.0 microns in diameter. The potential on nozzle 104 imparts a charge on dry particles 110 leaving nozzle 104. Consequently, dry particles 110 are electrostatically attracted to the upper surface 112 of substrate 102.

In one embodiment, a brief burst, or "puff", of gas pressure from container 108 through line 106 is used to carry dry particles 110 out of holder 124 and out of the exit end 126 of nozzle 104. Preferably, the gas pressure is between about 40 and 100 psi. For example, the gas pressure could be 80 psi. Generally, the puff lasts between about 0.01 and 2 seconds. Preferably, the puff lasts for between 0.1 and 1 seconds.

The currents formed by the carrier gas 122 leaving nozzle 104 cause dry particles 110 to be approximately evenly distributed in a region 126 (depicted approximately in FIG. 1 with dotted lines) above substrate 102. Also, it is preferable that the particles do not aggregate as they are projected from nozzle 104, as this could result in unevenly sized masking areas. Similarly, it is preferable that dry particles 110 form a monolayer on the upper surface 112 of substrate 102.

Electrostatic attraction from substrate 102 and gravity then cause dry particles 110 to settle approximately evenly onto the upper surface 112 of substrate 102. The settling time depends in part on the size of the particles, the distance from the exit end 126 of nozzle 104 to the upper surface 112 of substrate 102, and the amount of electrostatic force. Typically, the settling time is between about 20 and 30 seconds.

Figure 2:
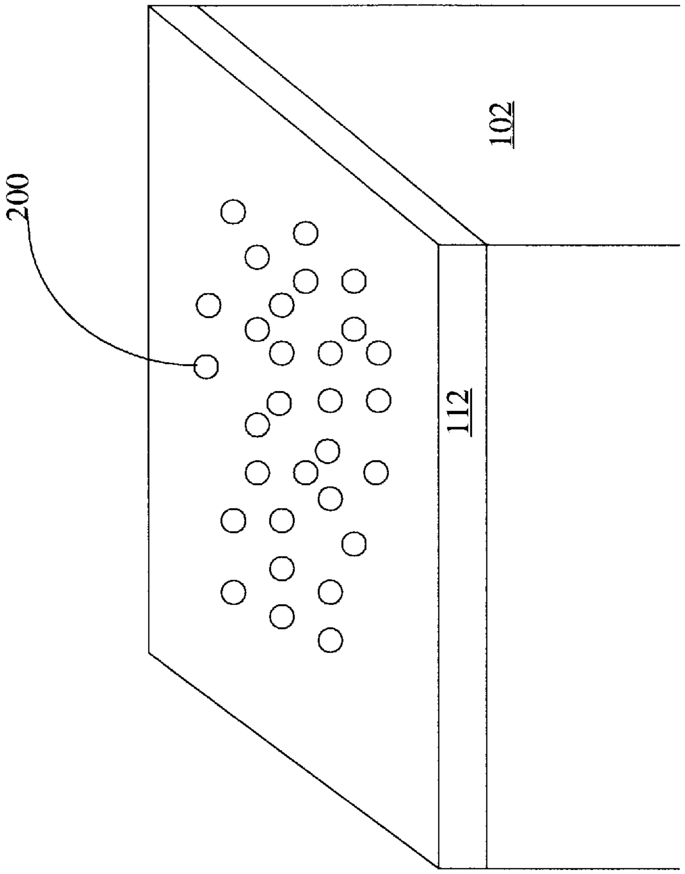
FIG. 2 is a three-dimensional view of a substrate on which particles have been dispensed according to an embodiment of the present invention.

When used to manufacture emitters on substrates for use in field emission displays, the dry particles are etch-resistant beads 200 that are distributed onto the upper surface 112 of substrate 102, as shown in FIG. 2. The spacing between the beads 200 may be controlled by varying the pressure of the carrier gas, the size of the nozzle, the electrostatic charge between the nozzle and the substrate, and the distance between the nozzle and the substrate. For example, it has been found that a pressure of 35 psi, passed through a 500 micron nozzle having a 0.5 ounce dose of particles, wherein the nozzle is at 5000 volts and the substrate is at 0 volts and the nozzle is 300 millimeters above the substrate, will tend to cause the particles to be evenly distributed at a density of approximately 40,000 particles per square millimeter.

Figure 3A:
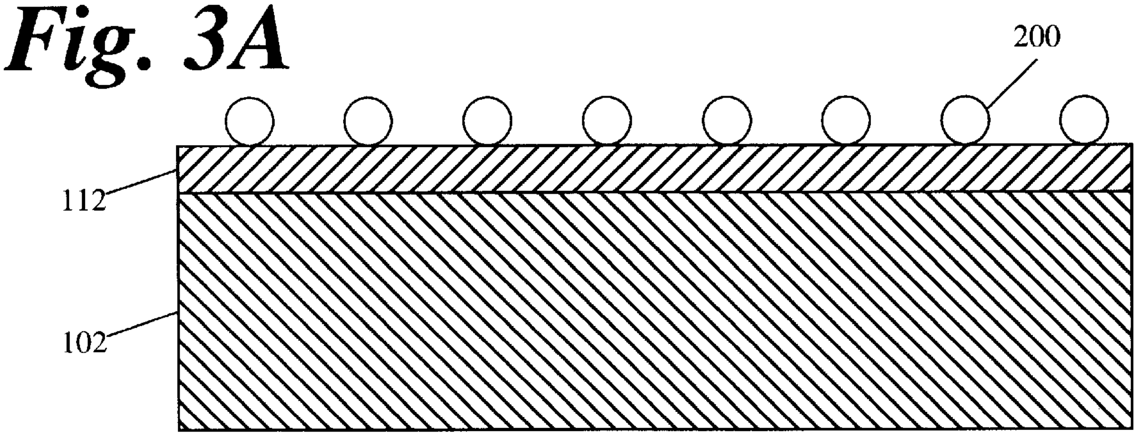
FIG. 3A is a cross-sectional view of a substrate on which particles have been dispensed according to an embodiment of the present invention.

As shown in cross-section in FIG. 3A, substrate 102 has an upper surface 112, on which have been disposed etch-resistant dry beads 200. In this embodiment, substrate 102 is formed of silicon and the upper surface 112 is a silicon dioxide layer formed on the silicon. Upper surface 112 serves as a hardmask.

Figure 3B:
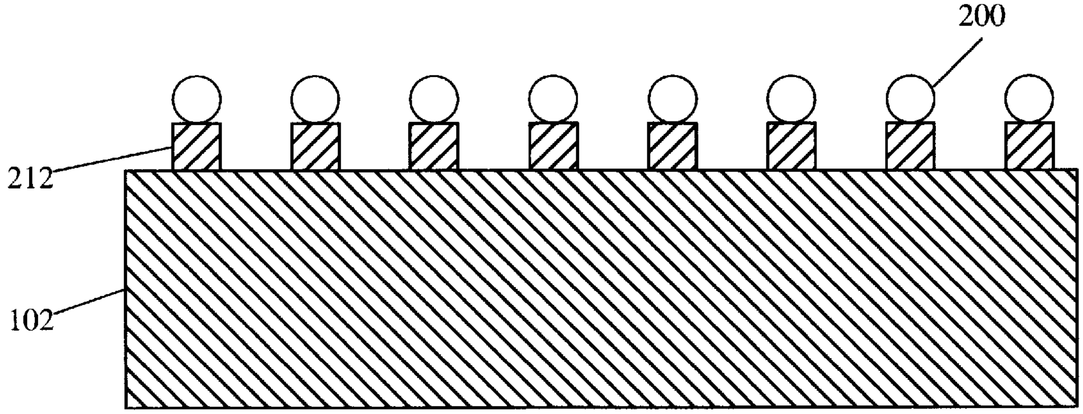
FIG. 3B is a cross-sectional view of the substrate shown in FIG. 3A after patterning of the hardmask.

After applying the beads 200, upper surface 112 is etched, using for example an anisotropic plasma etch, such as $CHF_3/CF_4/He$, or other known etchant. The portions of upper surface 112 that are covered by beads 200 are not etched by the beam. After the etching, columns 212 remain in upper surface 112 under each of the beads 200, as shown in FIG. 3B.

Figure 3C:
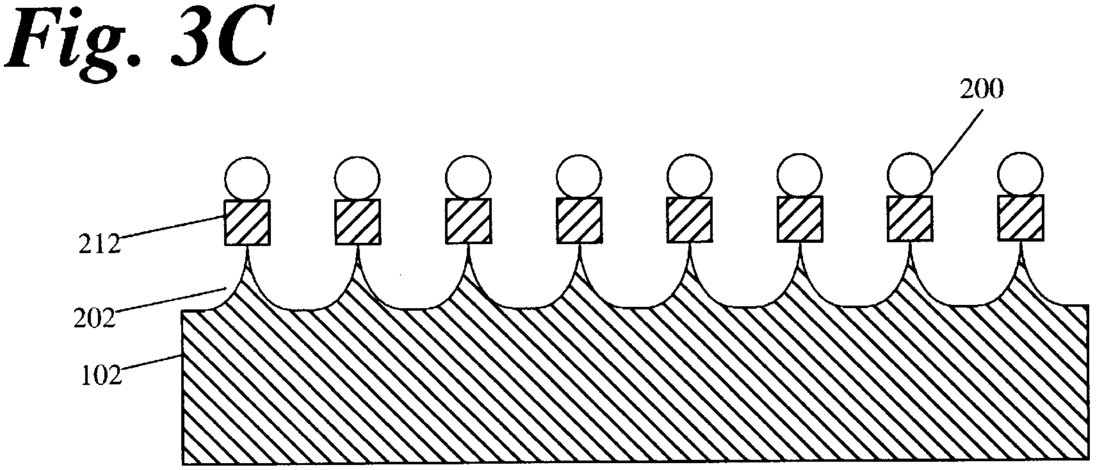
FIG. 3C is a cross-sectional view of the substrate shown in FIG. 3A after etching.

The substrate under columns 212 may then be etched to form emitter tips 202 through chemical etching, oxidation, or other techniques known in the art. The resulting emitter tips 202 are shown in FIG. 3C.

Figure 3D:
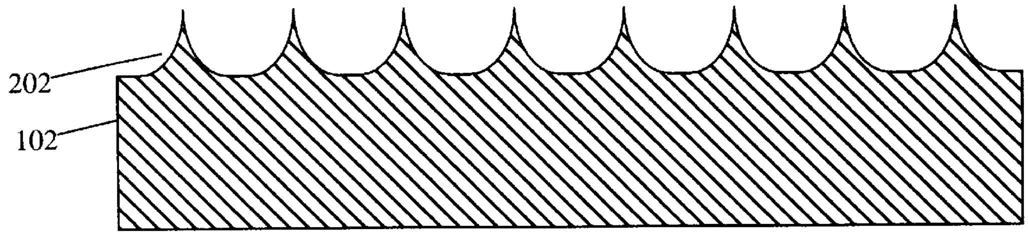
FIG. 3D is a cross-sectional view of the substrate shown in FIG. 3A after removal of the hardmask.

After the emitter tips 202 are formed, columns 212 and beads 200 are removed, as shown in FIG. 3D. This can be done with an HF-based wet etchant for oxide-based beads and columns. Alternatively, beads 200 may be removed after columns 212 are formed in the upper surface, but before forming emitter tips 202. This may be accomplished by immersion in an ultrasonic bath of DI for 10 minutes at room temperature.

Figure 4:
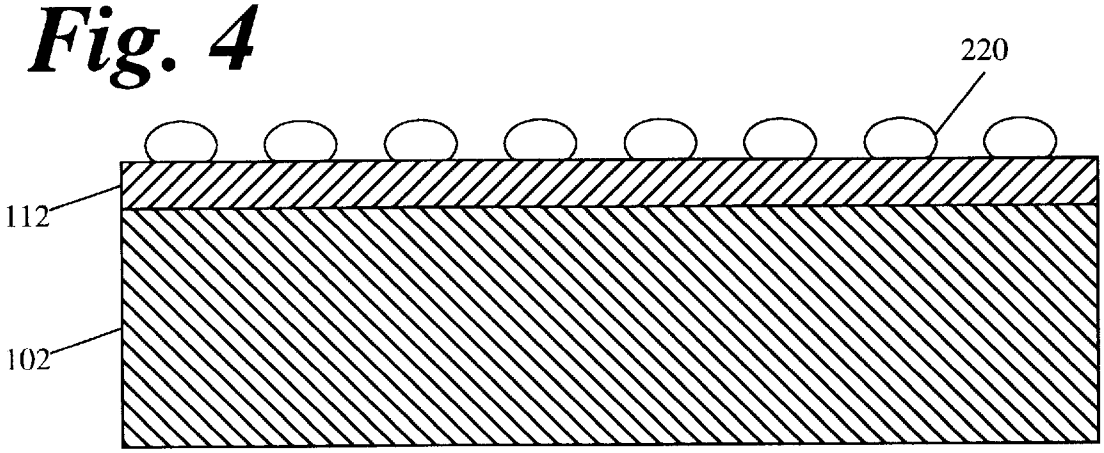
FIG. 4 is a cross-sectional view of a substrate on which particles have been dispensed according to a second embodiment of the present invention.

FIG. 4 shows another embodiment of the invention, in which the dry particles are melted in an oven after they have been disposed onto the silicon dioxide upper surface 112 of substrate 102. The resulting particles 220 are correspondingly larger in diameter than the as-deposited beads. The processing can then continue as described above.

Figure 5:
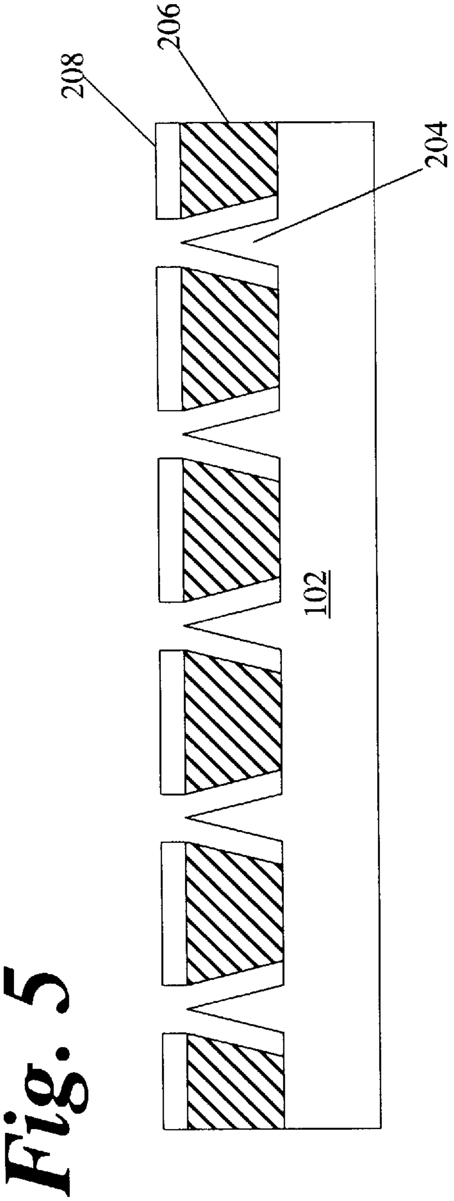
FIG. 5 is a cross-sectional view of a substrate after processing according to a third embodiment of the present invention.

After the emitter tips are formed, the substrate 102 may receive further processing, as shown in FIG. 5. For example, the silicon substrate 102 may be oxidized to sharpen the tips and then additional layers may be deposited and etched to form insulators 206 between each emitter 204 and gate electrode 208.

Figure 6:
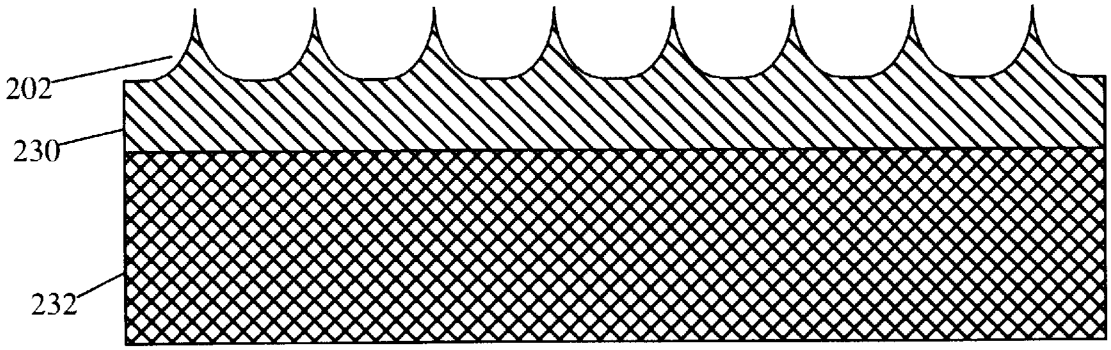
FIG. 6 is a cross-sectional view of a substrate after removal of the hardmask according to a fourth embodiment of the present invention.

Although the above process has been described with the emitters formed in a silicon substrate, it is understood that the substrate could be a suitable layer deposited on top of an insulator. For example, with a silicon-on-glass process, the emitters 202 would be formed in the silicon 230 on top of the glass insulator 232, as shown in FIG. 6.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

We claim:

1. A method for fabricating emitter tips for a field emission display comprising the steps of:

applying a substrate voltage to a substrate;

applying a nozzle voltage to a dispensing nozzle;

projecting a plurality of charged, dry particles having a size between 0.1 and 2 microns through the nozzle onto the substrate during the two applying steps such that the particles attract to the substrate; and etching the substrate with an etchant to which the plurality of dry particles are resistant to form emitter tips.

2. The method of claim 1, wherein the step of applying a substrate voltage includes the steps of disposing the substrate on a surface and applying the substrate voltage to the surface.

3. The method of claim 1, further comprising the step of charging the plurality of particles through the nozzle voltage applied to the dispensing nozzle.

4. The method of claim 1, wherein the step of applying a nozzle voltage includes applying a nozzle voltage, less than the substrate voltage, to the dispensing nozzle.

5. The method of claim 1, wherein the step of applying a nozzle voltage includes applying a nozzle voltage such that the absolute value of the difference between the substrate voltage and the nozzle voltage is between approximately 5000 and 80,000 volts.

6. The method of claim 1, further comprising the step of positioning the plurality of dry particles in the nozzle before the step of projecting the plurality of dry particles.

7. The method of claim 1, wherein the etching step includes etching the substrate with an anisotropic etchant.

8. A method for fabricating a microstructure comprising the steps of:

applying a voltage to a substrate having a mask surface on the substrate;

applying an electric charge to a plurality of dry particles;

projecting the plurality of charged, dry particles onto the mask surface of the substrate during the applying a voltage step to form a plurality of approximately evenly distributed etch masks such that the particles attract to the substrate;

etching the mask surface and the substrate with an etchant to which the plurality of dry particles are resistant; and removing the particles.

9. The method of claim 8, further comprising the step of melting the dry particles after the projecting step.

10. The method of claim 8, wherein the etching step includes forming columns in the mask surface beneath the plurality of dry particles.

11. The method of claim 8, wherein the etching step includes etching the substrate with an anisotropic plasma etch.

12. The method of claim 8, wherein the projecting step includes projecting the plurality of dry particles onto the substrate to form a plurality of etch masks each formed from a single projected dry particle.

13. A method for forming emitter tips comprising the steps of:

applying a voltage to a substrate;

applying an electric charge to a plurality of dry particles;

projecting the plurality of charged, dry particles onto the substrate during the applying a voltage step to form a plurality of approximately evenly sized etch masks such that the particles attract to the substrate;

forming emitter tips in the substrate; and removing the dry particles, wherein the forming emitter tips step includes etching the substrate with an etchant to which the dry particles are resistant.

14. The method of claim 13, wherein the step of forming emitter tips includes etching the substrate below the dry particles.

15. The method of claim 14, wherein the step of forming emitter tips includes forming emitter tips for a field emission display in the substrate.

16. The method of claim 13, further comprising the step of forming a mask surface on the substrate, and wherein the projecting step includes projecting the plurality of dry particles onto the mask surface.

17. The method of claim 16, wherein the step of forming emitter tips includes forming columns in the mask surface beneath the plurality of dry particles.

18. The method of claim 17, wherein the step of forming emitter tips includes forming emitter tips in the substrate below the columns.

19. The method of claim 13, wherein the projecting step includes projecting the plurality of dry particles onto the substrate to form a plurality of etch masks each formed from a single projected dry particle.

20. A method for fabricating a microstructure comprising the steps of:

applying a voltage to a substrate having a mask layer on the substrate;

applying an electric charge to a plurality of dry particles;

projecting the plurality of charged, dry particles onto the mask layer such that the particles attract to the mask layer;

etching the mask layer with an etchant to which the dry particles are resistant to form a plurality of columns in the mask layer; and etching the substrate after the etching the mask layer step.

21. The method of claim 20, further comprising the step of removing the dry particles before the etching the substrate step.

22. The method of claim 20, further comprising the step of removing the dry particles after the etching the substrate step.

23. The method of claim 20, wherein the etching the mask layer step includes etching the mask layer with an anisotropic etchant.

24. The method of claim 20, wherein the etching the substrate step includes etching the substrate with a chemical etchant.

25. The method of claim 20, further comprising the step of forming emitter tips in the substrate.

26. The method of claim 20, wherein the projecting step includes projecting the plurality of dry particles onto the mask layer to form a plurality of etch masks each formed from a single projected dry particle.

* * * * *